(12) United States Patent
Boucard

(10) Patent No.: US 8,824,295 B2
(45) Date of Patent: Sep. 2, 2014

(54) LINK BETWEEN CHIPS USING VIRTUAL CHANNELS AND CREDIT BASED FLOW CONTROL

(75) Inventor: Philippe Boucard, Le Chesnay (FR)

(73) Assignee: Qualcomm Technologies, Inc., San Diego, CA (US)

( * ) Notice: Subject to any disclaimer, the term of this patent is extended or adjusted under 35 U.S.C. 154(b) by 263 days.

(21) Appl. No.: 13/340,690

(22) Filed: Dec. 30, 2011

(65) Prior Publication Data

US 2013/0170506 A1  Jul. 4, 2013

(51) Int. Cl.
*H04L 12/26* (2006.01)
(52) U.S. Cl.
USPC .......................................................... 370/235
(58) Field of Classification Search
None
See application file for complete search history.

(56) References Cited

U.S. PATENT DOCUMENTS

| | | | |
|---|---|---|---|
| 6,359,861 B1 * | 3/2002 | Sui et al. | 370/230 |
| 6,373,850 B1 * | 4/2002 | Lecourtier et al. | 370/409 |
| 7,477,603 B1 * | 1/2009 | Pandian | 370/235 |
| 7,761,687 B2 * | 7/2010 | Blumrich et al. | 712/11 |
| 8,098,669 B2 * | 1/2012 | Solomon | 370/399 |
| 2002/0118640 A1 * | 8/2002 | Oberman et al. | 370/230 |
| 2004/0151203 A1 | 8/2004 | Gulati et al. | |
| 2004/0268085 A1 | 12/2004 | Hara et al. | |
| 2006/0277346 A1 * | 12/2006 | Doak et al. | 710/305 |
| 2008/0212613 A1 | 9/2008 | Perkinson et al. | |
| 2008/0259798 A1 | 10/2008 | Loh et al. | |
| 2008/0270599 A1 * | 10/2008 | Tamir et al. | 709/224 |
| 2008/0285562 A1 | 11/2008 | Scott et al. | |
| 2009/0127716 A1 | 5/2009 | Takatsuki | |
| 2010/0325318 A1 | 12/2010 | Desoli et al. | |
| 2013/0159669 A1 * | 6/2013 | Comparan et al. | 712/29 |

FOREIGN PATENT DOCUMENTS

EP  0858039 A2  8/1998

OTHER PUBLICATIONS

International Search Report—PCT/US2012/071598—ISA/EPO—Mar. 6, 2013.

\* cited by examiner

*Primary Examiner* — Anh-Vu Ly
(74) *Attorney, Agent, or Firm* — Muncy, Geissler, Olds & Lowe, P.C.

(57) ABSTRACT

A system and method is disclosed for multiple chips in which the connection between chips is made with registered inputs and registered outputs. This is achieved using a credit-based flow control protocol between the chips. The connection is made as part of a single packet-based on-chip and between-chip network with a common address space between the two chips.

9 Claims, 5 Drawing Sheets

LINK BETWEEN CHIPS USING VIRTUAL CHANNELS AND CREDIT BASED FLOW CONTROL

TECHNICAL FIELD

This invention is related to semiconductors and, more specifically, to network-on-chip technology applied for inter-chip communication.

BACKGROUND

Systems of chips may be designed to be interconnected, for example in prototypes of large ASIC designs built using more than one field programmable gate array (FPGA). In some systems it is acceptable to connect the chips using a communications protocol, such as Ethernet, in which the interface is recognized by initiators of data transfers, such as processors. In other systems it is beneficial, for reasons such as encoding and decoding latency, to use a communications protocol that is transparent to initiators by using a single address space fixed in the hardware of both chips.

Some interconnection networks of initiators and targets use packet based protocols because of physical implementation benefits. Compared to traditional transaction interfaces, packet based networks require less decoding logic and therefore faster signal propagation through the logic of the network topology. Furthermore, packetizing gives the ability to change data serialization with less logic area and long timing paths through logic.

Packet based networks also give the ability to easily add pipeline stages in data paths in order to break long timing delays between flops. Paths that propagate on a printed circuit board between chips are generally very slow compared to paths within a chip. Therefore it is desirable to have a layer of registers immediately at the outputs of one chip and the connected inputs of the other chip without any combinatorial logic in between the registers. This is particularly the case when the chips are FPGAs, which generally have special high speed input an output registers that can not be used if there is combinatorial logic between a register and an IO in the design.

In state of the art on-chip communication protocols, data flows forward from an upstream sender with a sideband signal indicating when the data signal is valid. A corresponding handshake signal flows backward to indicate that the downstream receiver is ready to receive the data. Pipeline registers can be added within the path to partition timing critical logic paths. One problem is that pipeline stage registers in the direction of data flow divide long timing paths on all forward going paths but not on the paths of backward going flow control signals. See FIG. 1 register 101. To pipeline a backward going Ready signal, as with the register 201 in FIG. 2, a register must store the data, as in register 202, from the previous cycle as the ready signal propagates backwards. This creates a combinatorial control path from the backward going Ready signal into the forward going logic. As a result, no combination of forward-going and backward-going pipe stages can avoid all combinatorial logic between registers at the IOs of chips. Therefore, what is needed is a system and method to provide registered inputs and output in a multi-chip systems.

SUMMARY

In accordance with the teachings of the present invention, a system, and method for same, is disclosed for multiple chips in which the connection between chips is made with registered inputs and registered outputs. This is achieved using a credit-based flow control protocol between the chips. The connection is made as part of a single packet-based on-chip and between-chip network.

DETAILED DESCRIPTION

Figure 1:
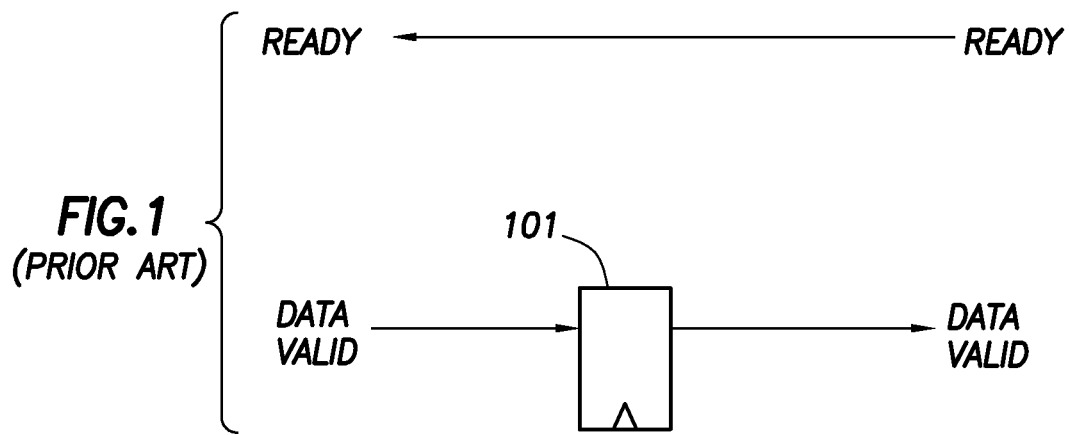
FIG. 1 illustrates a prior art system using a forward going pipe stage.
Figure 2:
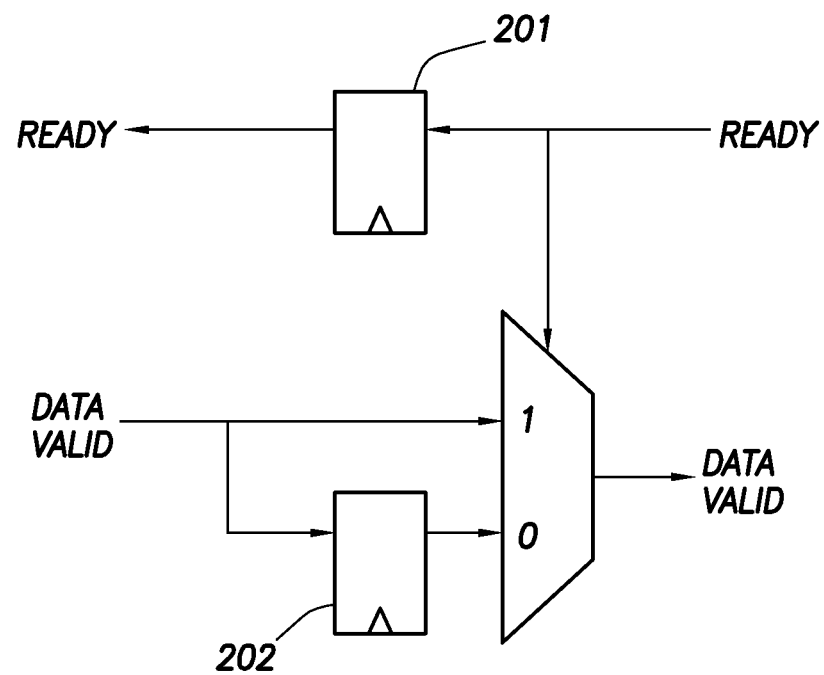
FIG. 2 illustrates a prior art system using a backward going pipe stage.
Figure 3:
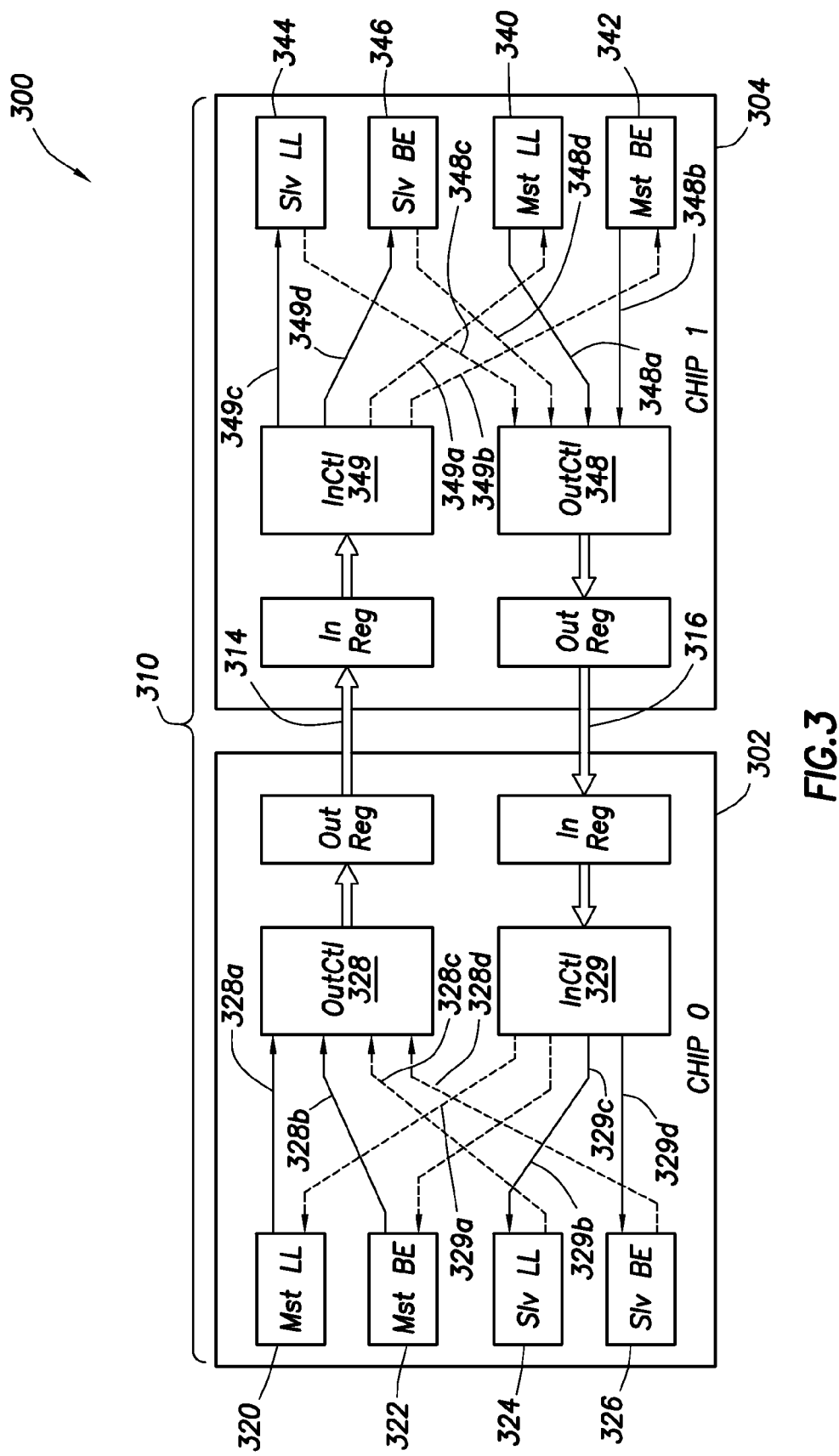
FIG. 3 illustrates a system for multi-chip communication in accordance with the teachings of the present invention.

Referring now to FIG. 3, a system 300 is shown with two chips 302 and 304. The chips are defined as semiconductor based devices. In accordance with one aspect of the present invention, there is a network 310 that convers the chip 302 and the chip 304. The chip 302 includes two masters 320 and 322 and two slaves 324 and 326. Similarly, the chip 304 includes two masters 340 and 342 and two slaves 344 and 346. Within the chip 302, the slave 324 and the master 320 require low latency transactions. Within the chip 302, the slave 326 and the master 322 are tolerant of best effort responsiveness of the system 300 to their transactions. Similarly, within the chip 304, the slave 344 and the master 340 require low latency transactions and the slave 346 and the master 342 are tolerant of best effort responsiveness of the system 300 to their transactions. In accordance with the teachings of the present invention, the scope of the present invention is not limited by the number or the type of masters or slaves within one chip.

Solid lines in FIG. 3 indicate routes for requests within the system 300. Dashed lines indicate routes for responses within the system 300. Transaction requests and responses are transmitted and received as packets.

In accordance with one aspect of the present invention, links 314 and 316 exists between the chips 302 and 304 and connect masters and slaves of each chip to the other chip. The link 314 carries data transmissions from the chip 302 that are received by the chip 304. The link 314 is directly connected to an output register of the chip 302 and an input register of the chip 304. The link 316 carries transmissions from the chip 304 and received by the chip 302. The link 316 is directly connected to an output register of the chip 304 and an input register of the chip 302. In accordance with another aspect of the present invention, the chip 302 and the chip 304 may be connected through one link. Thus, the scope of the present invention is not limited by the number of links that connect the chip 302 and the chip 304.

Data read transactions require two phases, a request and a response. The request contains the address and the response contains the data. According to one aspect of the invention, data write transactions also require two phases. The request contains the data and the response contains an acknowledgement. According to another aspect of the invention, data write transactions are done in a single phase without response. According to yet another aspect of the present invention, some data write transactions are done in two phases, while others are done in one phase. Requests from initiators and responses from targets are received by an output control module. Symmetrically, in accordance with one aspect of the present invention, an input control module transmits requests to slaves and responses to masters. In accordance with another aspect of the present invention, the system 300 is not symmetric.

In accordance with one aspect of the present invention, in the system 300 each link 314 and 316 has four virtual channels, one for each of LL requests, BE requests, LL responses, and BE responses. A virtual channel is a path sharing physical resources like wires with other traffic, but having its own flow-control so that it is not blocked by the other traffic.

An OutCtl module 328 of the chip 302 performs the function of time multiplexing packets from the four channels 328 a-d on the link 314. Similarly, an OutCtl module 348 of the chip 304 performs the function of time multiplexing packets from the four channels 348 a-d on the link 316. In accordance with another aspect of the present invention, other types of multiplexing schemes may be used without deviation from the scope of the present invention.

An InCtl module 329 of the chip 302 has a FIFO to receive the physical units (phits) of packets transmitted over the link 316. The OutCtl module 348 of the chip 304 maintains a credit counter for each channel 348 a-d, the maximum count of which is equal to the number of phits of FIFO buffering in the InCtl module 329 of the chip 302 at the receiving end of the link 316.

The link 314 and the link 316 between the chip 302 and the chip 304 use a protocol that includes the following signals:

On—Indicates that transmitting chip has exited from reset. It is used by the InCtl module of the receiving chip to avoid sending credits while the OutCtl module is under reset.

Tail—Indicates the last cycle of a packet.

Go—Indicates to the InCtl module of the receiving chip that it can start sending the current packet on the network of the receiving chip.

Data—Carries the Data signal of the transported packets.

Chnl0 to Chnl3—Each of these signal groups carries control information associated with each channel, and they contains the following signals:

Vld—Indicates a valid data transfer associated with this channel. Vld is only asserted for one channel at a time.

Crd—Indicates that a credit is sent back for this channel. There is no dependency between channels for credits.

Press—Propagates a priority signal for traffic pending on this channel when the OutCtl module has no credit for this channel. In accordance with one aspect of the present invention, some embodiments will not include this signal.

All signals are outputs of the sending chip and inputs of the receiving chip, except for the Crd signal, which goes in the reverse direction.

Figure 4:
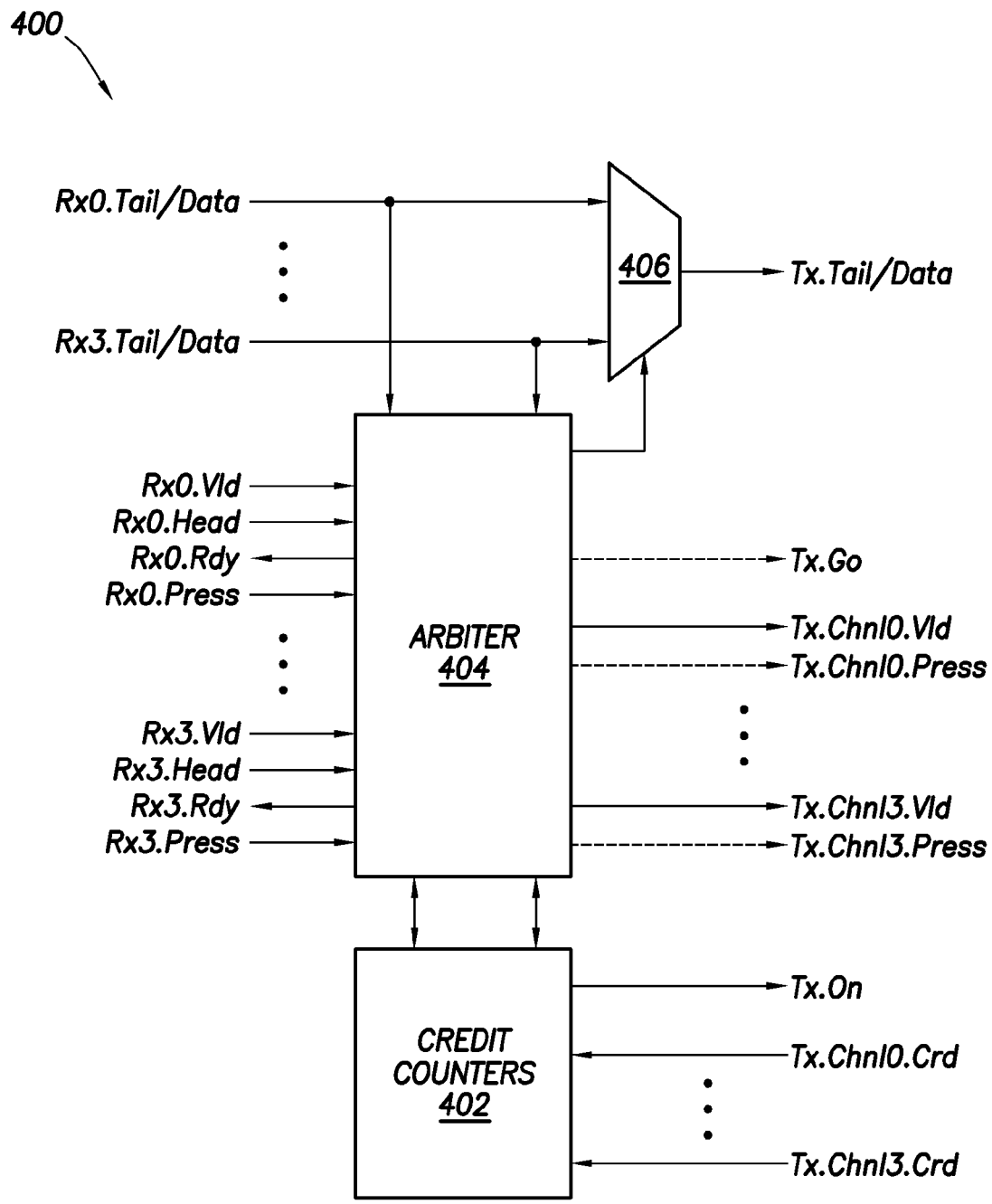
FIG. 4 illustrates the OutCtl module of the system of FIG. 3 in accordance with the teachings of the present invention.

Referring now to FIG. 4, an OutCtl module 400, such as the OutCtl module 328 of chip 302 in FIG. 3 or the OutCtl module 348 of chip 304 in FIG. 3, is shown in FIG. 4. In accordance with one aspect of the present invention, the OutCtl module 400 includes a credit counter submodule 402. The count is incremented each clock cycle that the corresponding channel Crd signal is asserted, decremented on each clock cycle that corresponding channel Vld signal is asserted, and unchanged if both conditions occur in the same clock cycle. When the counter is zero, the Vld signal for that channel will not be asserted. The credit counter submodule 402 also generates the On signal. That signal is 0 during reset and 1 when reset is removed. It indicates to the receiving chip that the Tx module is able to accept and track credit counters.

In accordance with another aspect of the present invention, the OutCtl module 400 also contains an arbiter submodule 404. The arbiter submodule 404 decides which channel will be elected to transmit a phit in each cycle. It is responsible for achieving low latency, avoiding the proliferation of bubbles, and driving Press priority. The OutCtl module 400 also generates the binary encoded Press priority signal on the link.

Zero or one low latency channel at a time, and never a best effort channel, can be in an engaged state. Completing transactions on the engaged channel, if one is engaged, is the highest priority. This avoids the possibility of deadlock in the network between the chips or the network within a chip. The engaged channel yields the link to other channels when it has no credits available or when a bubble cycle (a cycle with no valid data) is encountered. When a phit for an engaged channel is sent on the link with a Go signal, it indicates to a receive (Rx) module 406 in the receiving chip that the packet should be sent immediately, without buffering, in order to minimize latency. In accordance with the teachings of the present invention, a low latency channel becomes engaged immediately when no other channel is engaged.

Figure 5:
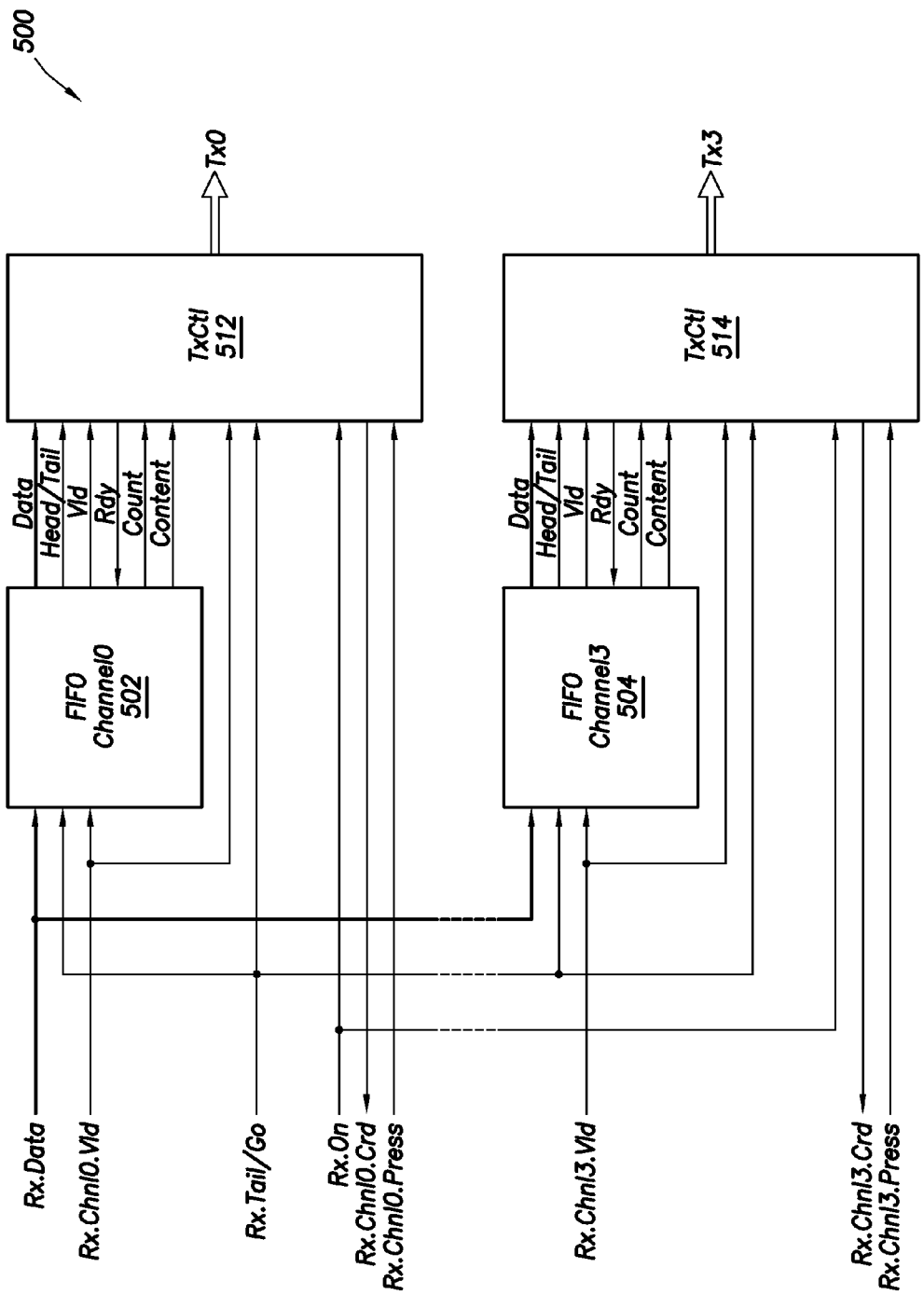
FIG. 5 illustrates the InCtl module of the system of FIG. 3 in accordance with the teachings of the present invention.

Referring now to FIG. 5, an InCtl module 500, such as the InCtl module 329 of chip 302 in FIG. 3 or the InCtl module 349 of chip 304 in FIG. 3, includes a FIFO submodule, such as FIFO submodule 502 and 504 of FIG. 5, for each channel. Its depth is at least 1 full packet plus 4 phits to allow for full-bandwidth operation. Each entry holds a single phit and two extra bits that hold the priority associated with each phit. In accordance with other aspects of the present invention, other embodiments can include logic to check for FIFO over-run or under-run conditions. The InCtl module 500 also has a TxCtl submodule, such as TxCtl submodules 512 and 514, for each channel. The TxCtl submodule reconstitutes packets in the receiving chip from the interleaved phits of different packets sent across the link. The reconstituted packet is generated and sent immediately upon receiving the Go signal, which is applied for low latency packets, upon receiving the Tail signal, which indicates that a full packet is in the FIFO or that the FIFO is full. The priority of the packet header is encoded from the received Press priority.

Figure 6:
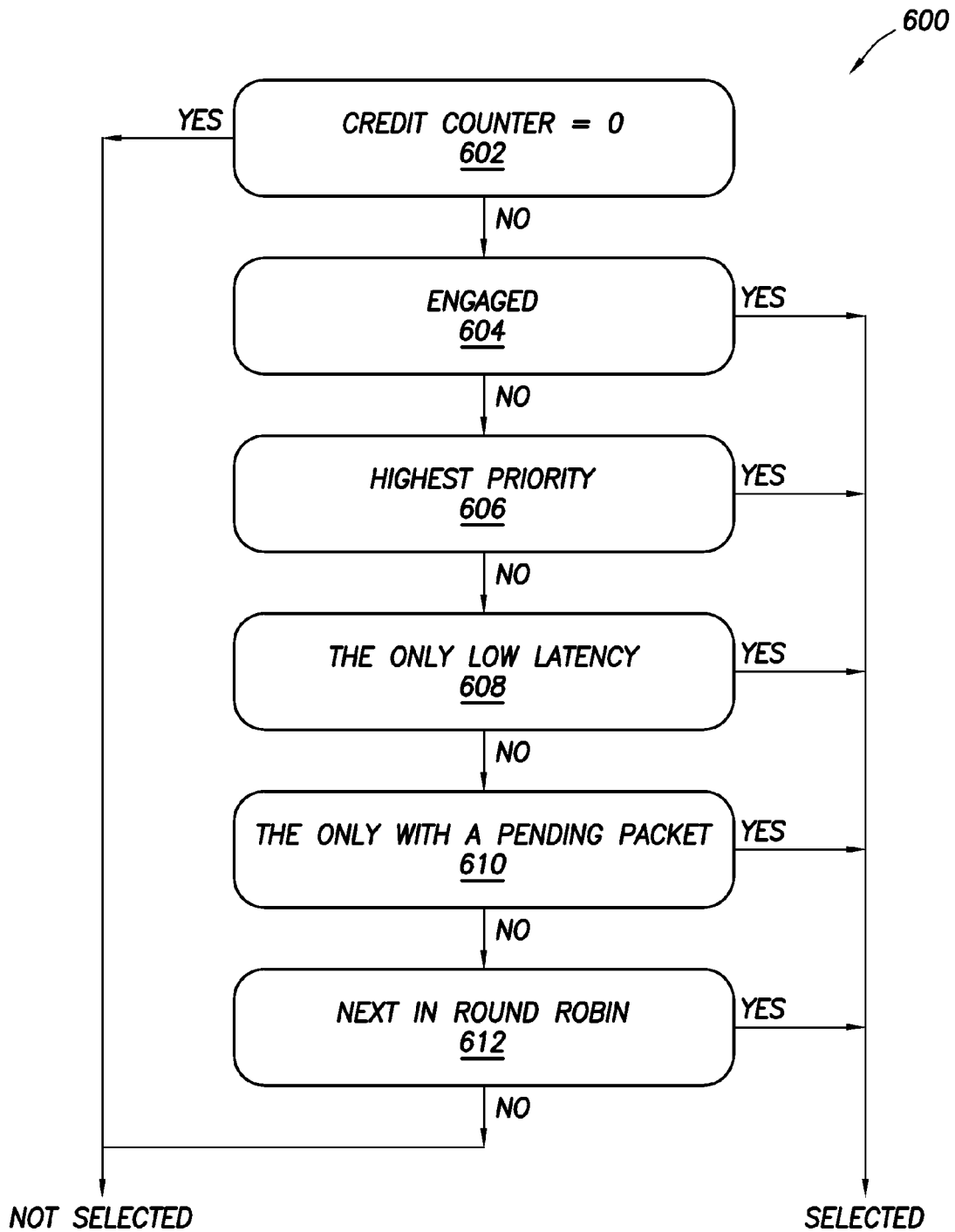
FIG. 6 is a flow chart of the criteria used to determine the next channel to grant access to the shared link in accordance with the teachings of the present invention.

Referring now to FIG. 6, a process flow 600 is shown for granting a channel. The arbiter considers selection criteria as follows: At step 602 if the counter for the channel is zero, then the channel is not selected. If at step 602, the credit counter for the channel is greater than zero, then at step 604 the state of the channel is engaged and the channel is selected. If the channel is not engaged at step 604, then at step 606, if the Press priority of the channel is equal to the highest of all channels with pending packets, then the next channel in a round robin scheme is selected. If not, then at step 608 if the channel is the only low latency channel, it is selected. If not, then at step 610 if the channel is the only channel that already has a packet pending, it is selected. If not, then at step 612 the channel is next among equals in a round robin ordering scheme and the channel is selected.

After reset the TxCtl submodule waits to receive the On signal from the other chip, at which time TxCtl submodule sends a credit signal back to the other chip each time that a phit is accepted by the receiving chip or when a phit is popped from the FIFO submodule.

Using a credit based flow control scheme means that the unavailability of a resource need not be signaled in the same cycle as the request for that resource. Specifically, the availability of a downstream part of the communication network is signaled in advance by the provision of tokens. Thereby a request to transfer data need not receive a combinatorial signal for the availability of the downstream resource in the connected chip. As a result, the inter-chip communication protocol of the invention allows signals for data and the signals for the flow control can be separately registered. Therefore, all signals between the chips can be directly registered on inputs and outputs. Furthermore, token or credit related signals, such as those shown in FIG. 4 and FIG. 5, are sent from an input register to an output register.

It is to be understood that this invention is not limited to particular embodiments or aspects described, as such may vary. It is also to be understood that the terminology used herein is for the purpose of describing particular embodiments only, and is not intended to be limiting, since the scope of the present invention will be limited only by the appended claims.

Where a range of values is provided, such as the number of channels or the number of chips or the number of modules, it is understood that each intervening value, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Any methods and materials similar or equivalent to those described herein can also be used in the practice or testing of the present invention.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A system using a protocol for data transfer, the system comprising:
   a chip including a first register to send data through a link; and
   a connected chip including a second register to receive data through the link,
   wherein the link forms a transfer network,
   wherein the transfer network uses the protocol for data transfer,
   wherein the transfer network includes at least two virtual channels that share the link,
   wherein at least one virtual channel selected from the at least two virtual channels is a low-latency virtual channel,
   wherein the protocol for data transfer employs packet based data transfer using a common address space,
   wherein packets from the low-latency virtual channel complete on the link before other data is sent,
   wherein a higher priority packet can start being transmitted while a lower priority packet is already being transmitted if the lower priority packet is not on the low-latency virtual channel,
   wherein an availability of data reception capability in the connected chip is indicated to the chip as a credit token sent from the connected chip to the chip, and
   wherein packets from the low-latency virtual channel complete after other data when the low-latency channel has no credit token.

2. The system of claim 1, wherein at least one protocol related signal of the link from the chip to the connected chip is driven directly from the first register of the chip to the second register of the connected chip.

3. The system of claim 2, wherein at least one protocol related signal of the link from the connected chip to the chip is driven directly from the second register of the connected chip to the first register of the chip.

4. The system of claim 1 wherein requests made by an initiator in the chip are transferred to the connected chip on the link and responses from the chip to an initiator in the connected chip are transferred on a second link.

5. The system of claim 1 wherein packets transferred between the chip and the connected chip can be interleaved on a granularity smaller than a full packet.

6. The system of claim 5 wherein the connected chip comprises a buffer per virtual channel to reassemble packets.

7. The system of claim 1 where the connected chip comprises a receive buffer for holding a full packet and four phits.

8. The system of claim 1 wherein data transfer represents traffic and wherein the traffic is associated with one or more classes, the classes being given different access priority to the link.

9. The system of claim 1 wherein between the chip and the connected chip is included at least one handshake signal to indicate a reset state for any one chip from the group including the chip and the connected chip.

* * * * *